(12) United States Patent
Dierkhising et al.

(10) Patent No.: US 10,740,479 B2
(45) Date of Patent: *Aug. 11, 2020

(54) CONTROLLING ACCESS TO REMOVABLE NON-VOLATILE MEMORY DEVICE USING INSTRUCTION FILE

(71) Applicant: International Business Machines Corporation, Armonk, NY (US)

(72) Inventors: Lisa Hollermann Dierkhising, Olmsted, MN (US); Justin K. King, Rochester, MN (US); Michelle A. Schlicht, Rochester, MN (US); Lee N. Helgeson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 217 days.

This patent is subject to a terminal disclaimer.

(21) Appl. No.: 15/878,493

(22) Filed: Jan. 24, 2018

(65) Prior Publication Data

US 2019/0228167 A1 Jul. 25, 2019

(51) Int. Cl.
*G06F 21/62* (2013.01)
*H04L 9/30* (2006.01)
(Continued)

(52) U.S. Cl.
CPC .......... *G06F 21/62* (2013.01); *G06F 21/6218* (2013.01); *H04L 9/30* (2013.01);
(Continued)

(58) Field of Classification Search
CPC .... G06F 21/604; G06F 21/62; G06F 21/6218; G06F 21/6236; H04L 63/101
See application file for complete search history.

(56) References Cited

U.S. PATENT DOCUMENTS

2006/0277363 A1* 12/2006 Qiu ...................... G06F 11/1076
711/114
2007/0204265 A1* 8/2007 Oshins .................. G06F 9/4856
718/1
(Continued)

FOREIGN PATENT DOCUMENTS

EP 3147792 A1 3/2017
WO 2014189986 A1 11/2014

OTHER PUBLICATIONS

Nanavati, Mihir, et al. "Decibel: Isolation and Sharing in Disaggregated Rack-Scale Storage", NSDI. 2017. <https://www.usenix.org/system/files/conference/nsdi17/nsdi17-nanavati.pdf>.
(Continued)

*Primary Examiner* — David J Pearson
(74) *Attorney, Agent, or Firm* — Patterson + Sheridan, LLP

(57) ABSTRACT

A method is disclosed, as well as a related system and computer program product, for use with a plurality of networked computing devices comprising a plurality of physical ports. The method comprises determining that a non-volatile memory (NVM) device is removably connected with a first port owned by a first virtual machine associated with a first owning entity, and determining whether the NVM device was previously connected with a second port owned by a second virtual machine associated with a second owning entity. The method further comprises determining whether the NVM device has a predefined association with a first instruction file that specifies one or more restrictions for accessing data stored in the NVM device. The method further comprises providing, to the first virtual machine, access to the data stored in the NVM device in accordance with the one or more restrictions.

17 Claims, 4 Drawing Sheets

(51) Int. Cl.
*H04L 29/06* (2006.01)
*G06F 9/455* (2018.01)
(52) U.S. Cl.
CPC .............. *H04L 63/10* (2013.01); *H04L 63/12* (2013.01); *G06F 9/455* (2013.01); *H04L 63/0823* (2013.01)

(56) References Cited

U.S. PATENT DOCUMENTS

| | | | | |
|---|---|---|---|---|
| 2008/0104705 | A1* | 5/2008 | Hasbun | G06F 21/105 |
| | | | | 726/26 |
| 2014/0020083 | A1 | 1/2014 | Fetik | |
| 2015/0319243 | A1* | 11/2015 | Hussain | G06F 3/06 |
| | | | | 709/217 |
| 2016/0034217 | A1 | 2/2016 | Kim et al. | |
| 2016/0378359 | A1 | 12/2016 | Jang et al. | |
| 2019/0215341 | A1* | 7/2019 | Bharadwaj | H04L 67/1097 |

OTHER PUBLICATIONS

Richter, Andre, et al., "Denial-of-service attacks on pci passthrough devices: Demonstrating the impact on network-and storage-i/o performance", Journal of Systems Architecture 61.10 (2015): 592-599. <http://publications.andre-richter.com/richter2015denial.pdf>.
U.S. Appl. No. 16/449,620, Controlling Access to Removable Non-Volatile Memory Device Using Instruction File, as filed on Jun. 24, 2019.
IBM, "List of IBM Patents or Patent Applicaitons Treated as Related," for U.S. Appl. No. 15/878,493, "Controlling Access to Removable Non-Volatile Memory Device Using Instruction File," as filed on Jan. 24, 2018.

\* cited by examiner

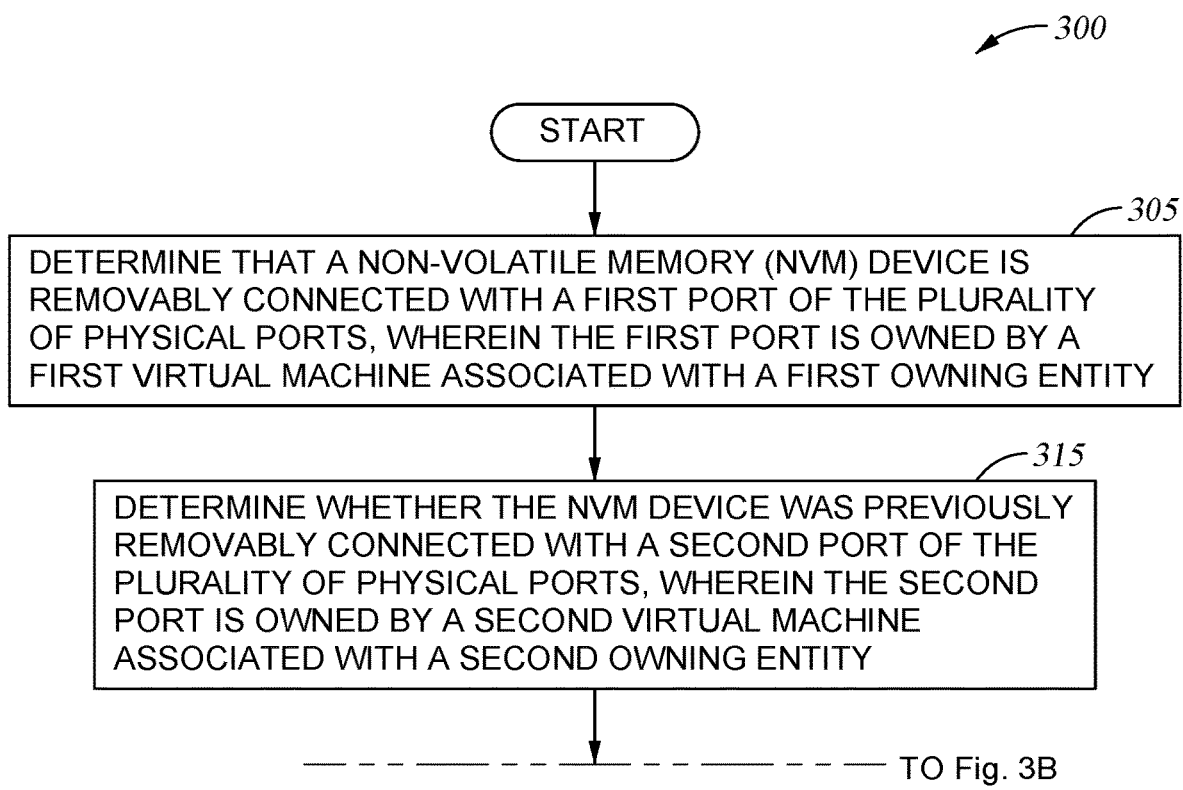

CONTROLLING ACCESS TO REMOVABLE NON-VOLATILE MEMORY DEVICE USING INSTRUCTION FILE

BACKGROUND

The present disclosure relates to non-volatile memory (NVM) devices, and more specifically, to controlling access to removable NVM devices using an instruction file.

SUMMARY

According to one embodiment, a system comprises a non-volatile memory (NVM) device and a plurality of networked computing devices comprising a plurality of physical ports. A first computing device of the plurality of networked computing devices is configured to determine that the NVM device is removably connected with a first port of the plurality of physical ports, wherein the first port is owned by a first virtual machine associated with a first owning entity. The first computing device is further configured to determine whether the NVM device was previously removably connected with a second port of the plurality of physical portions, wherein the second port is owned by a second virtual machine associated with a second owning entity. The first computing device is further configured to determine whether the NVM device has a predefined association with a first instruction file, wherein the first instruction file specifies one or more restrictions for accessing, by owning entities other than the second owning entity, data stored in the NVM device. The first computing device is further configured to provide, to the first virtual machine, access to the data stored in the NVM device in accordance with the one or more restrictions.

According to another embodiment, a computer program product is disclosed for use with a plurality of networked computing devices comprising a plurality of physical ports. The computer program product comprises a computer-readable storage medium having computer-readable program code embodied therewith. The computer-readable program code executable by one or more computer processors to determine that a non-volatile memory (NVM) device is removably connected with a first port of the plurality of physical ports, wherein the first port is owned by a first virtual machine associated with a first owning entity. The computer-readable program code is further executable to determine whether the NVM device was previously connected with a second port of the plurality of physical ports, wherein the second port is owned by a second virtual machine associated with a second owning entity. The computer-readable program code is further executable to determine whether the NVM device has a predefined association with a first instruction file, wherein the first instruction file specifies one or more restrictions for accessing, by owning entities other than the second owning entity, data stored in the NVM device. The computer-readable program code is further executable to provide, to the first virtual machine, access to the data stored in the NVM device in accordance with the one or more restrictions.

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3A and 3B illustrate an exemplary method for use with a plurality of networked computing devices comprising a plurality of physical ports, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Data centers and other systems of networked computing devices may include a non-volatile memory (NVM) on removably connected devices. For example, NVM Express® (also NVMe™) is one type of high-performance removable storage used by data centers and by virtual machines (VMs) running therein. NVM Express is a registered trademark, and NVMe is a trademark, of NVM Express, Inc. Another non-limiting example of removably connected devices having a NVM includes Universal Serial Bus (USB) mass storage devices.

When a removably connected device is moved to a different physical port on the same computing device or on a different computing device, the data included in the NVM may not be fully secured. For example, a first VM may "own" a first physical port to which an NVM device is first connected, and a second VM may own a second physical port to which the NVM device is later connected. Although the first VM encrypting the data on the NVM device may be effective to prevent the second VM from reading the data, the second VM may still delete the data without obtaining permission from the first VM.

According to embodiments described herein, a NVM device may be associated with an instruction file that specifies one or more restrictions for accessing data stored in the NVM device. The one or more restrictions may be applied to owning entities other than the owning entity that provided the instruction file. The one or more restrictions may comprise one or more of restricting the other owning entities from deleting the data, restricting the other owning entities from reading the data, and communicating a request to the owning entity that provided the instruction file.

Figure 1:
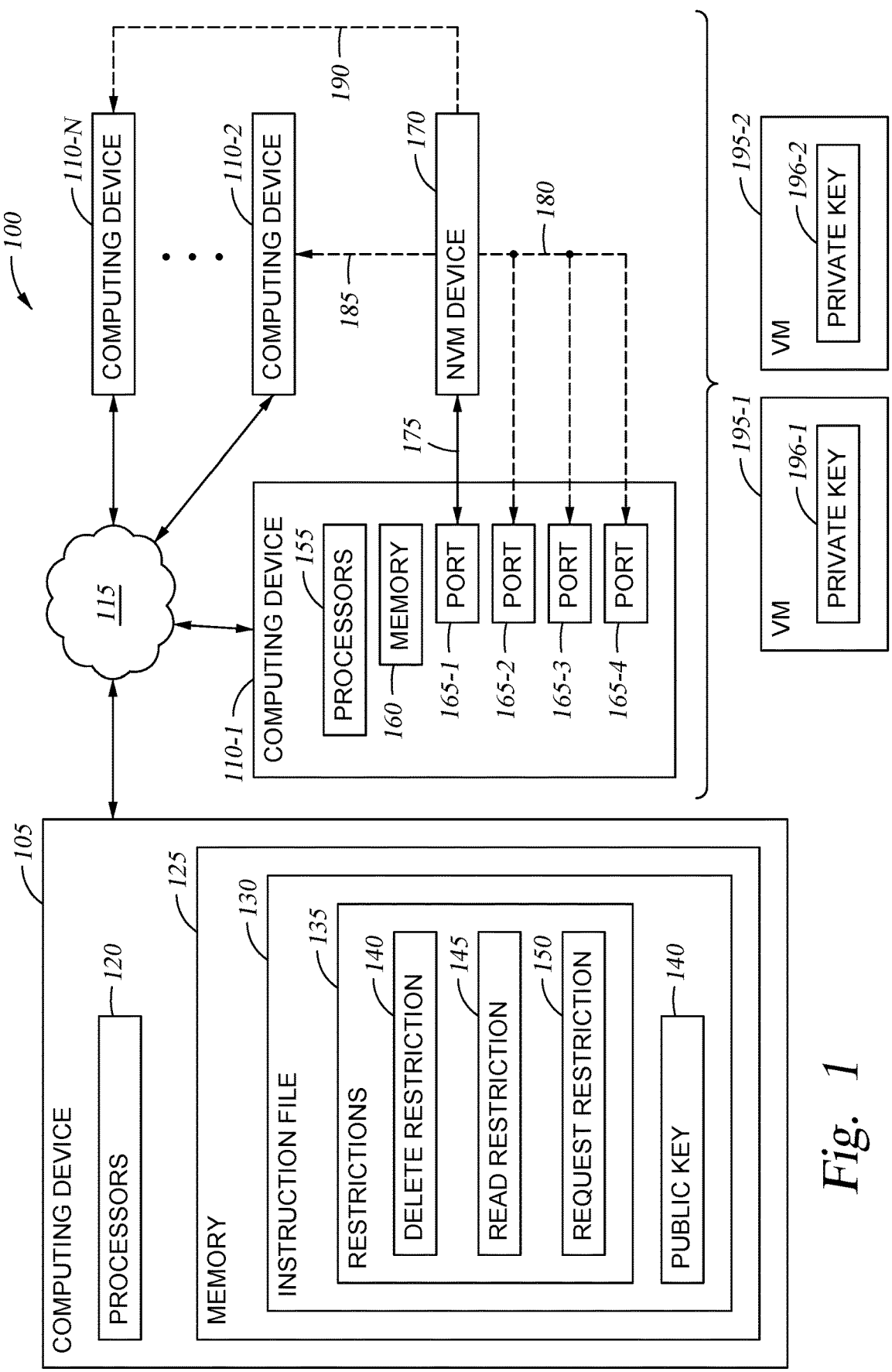
FIG. 1 is a diagram illustrating an exemplary system comprising a NVM device, according to one or more embodiments.

FIG. 1 is a diagram illustrating an exemplary system 100 comprising a NVM device 170, according to one or more embodiments. The system 100 comprises a computing device 105 that is communicatively coupled via a network 115 with a plurality of computing devices 110-1, 110-2, . . . , 110-N (generically referred to as a computing device 110).

The computing device 105 comprises one or more computer processors 120 and a memory 125. The one or more computer processors 120 represent any number of processing elements that each can include any number of processing cores. Some non-limiting examples of the one or more computer processors 120 include a microprocessor, a digital signal processor (DSP), an application-specific integrated chip (ASIC), and a field programmable gate array (FPGA), or combinations thereof. In one embodiment, the one or more computer processors 120 comprise a host processor and an ASIC configured to perform display updating using information provided by the host processor. The memory 125 may comprise volatile memory elements (such as random access memory), non-volatile memory elements (such as solid-state, magnetic, optical, or Flash-based storage), and combinations thereof. Moreover, the memory 125 may be distributed across different mediums (e.g., network storage or external hard drives).

The computing device 110-1 comprises one or more computer processors 155 and a memory 160. The one or more computer processors 155 may have characteristics similar to those discussed above with respect to the one or more computer processors 120 of the computing device 105. The memory 160 may have characteristics similar to those discussed above with respect to the memory 125 of the computing device 105. The computing device 110-1 comprises a plurality of physical ports 165-1, 165-2, 165-3, 165-4 (generically referred to as port 165) that are communicatively coupled with the one or more computer processors 155. The ports 165 may have any suitable form, such as internal expansion slots and/or external connectors of the computing device 110-1. For example, the computing device 110-1 may include one or more PCIe slots and/or USB connectors.

The network 115 may represent one or more networks of any suitable type(s) for communicatively coupling the computing device 105 with the plurality of computing devices 110. For example, the network 115 may comprise the Internet, a local area network (LAN), a wide area network (WAN), and/or a wireless network. The network 115 may comprise copper transmission cables, optical transmission fibers, wireless transmission, routers, firewalls, switches, gateway computers, and/or edge servers.

In some embodiments, the plurality of computing devices 110 are configured to provide computing resources such as the processors 155, the memory 160, and/or the ports 165 for virtualization (i.e., arranging the computing resources as one or more VMs 195-1, 195-2). In some embodiments, the computing device 105 is configured to provide supervisory and/or management functions for the virtualization. Stated another way, the computing device 105 may be configured to dynamically configure and/or reconfigure the one or more VMs 195-1, 195-2. In some embodiments, the computing device 105 may be configured to provide computing resources for the virtualization.

The computing device 105 may have any implementation suitable for providing the supervisory and/or management functions. In one embodiment, the computing device 105 comprises a hypervisor or other software executed using the one or more computer processors 120. In another embodiment, the computing device 105 comprises a hardware management console.

In the system 100, the NVM device 170 is removably connected with the physical port 165-1 via a first connection 175. The NVM device 170 may have any suitable implementation. In some embodiments, the NVM device 170 is included in one of a solid-state drive (SSD) configured to communicate using NVMe, a Peripheral Component Interconnect Express (PCIe®) card, and a USB device. PCIe® is a registered trademark of the Peripheral Component Interconnect Special Interest Group. Other types of implementations of the NVM device 170, including alternate protocols, are also possible.

The NVM device 170 may be disconnected from the physical port 165-1 and later connected with one or more other ports 165. For example, a potential connection 180 is illustrated between the NVM device 170 and each of ports 165-2, 165-3, and 165-4 of the computing device 110-1, a potential connection 185 is illustrated between the NVM device 170 and any ports 165 included in the computing device 110-2, and a potential connection 190 is illustrated between the NVM device 190 and any ports 165 included in the computing device 110-N.

Although the NVM device 170 may be physically connected to different ports 165, in some cases the different ports 165 may be "owned" by different VMs 195-1, 195-2 (generically, VM 195). Thus, simply by connecting the NVM device 170 to a different port 165, a different VM 195-1 or 195-2 (which in some cases may have a different owning entity) may be able to access the data on the NVM device 170 without authorization. In this way, the data on the NVM device 170 may not be fully secured.

In some embodiments, the computing device 105 is configured to determine when the NVM device 170 is removably connected with a first port 165. Assume that the first port 165 is owned by a first VM 195-1 associated with a first owning entity (e.g., a first user or customer). The computing device 105 may further determine whether the NVM device 170 was previously connected with a second port 165, and whether the second port 165 is owned by a second VM 195-2 associated with a second owning entity (e.g., a second user or customer).

The computing device 105 may further determine whether the NVM device 170 has a predefined association with an instruction file 130. The instruction file 130 specifies one or more restrictions 135 for accessing data stored in the NVM device 170. In some embodiments, the one or more restrictions 135 are applied for owning entities other than the current owning entity. For example, if the NVM device 170 was previously connected with the second port 165, the second owning entity may be the current owning entity.

In some embodiments, the one or more restrictions 135 comprise a delete restriction 140, a read restriction 145, and/or a request restriction 150. Other types of access restrictions are also possible. One example of the delete restriction 140 may restrict all owning entities other than the current owning entity from deleting the data stored in the NVM device 170. One example of the read restriction 145 may restrict all owning entities other than the current owning entity from reading the data stored in the NVM device 170. One example of the request restriction 150 may require the computing device 105 (or the VM 195-1 associated with the transfer of the NVM device 170) to communicate a request to the current owning entity prior to providing delete access or read access to the data stored in the NVM device 170.

In some embodiments, when the NVM device 170 has the predefined association with the instruction file 130, the computing device 105 provides access to the VM 195-1 in accordance with the one or more restrictions 135. However, in cases where the NVM device 170 does not have a predefined association with the instruction file 130 (or alternately, no instruction file 130 exists), the computing device 105 may apply a default access rule for the VM 195-1 that owns the first port 165. In some embodiments, the default access rule may provide the VM 195-1 with full read and delete access to the data on the NVM device 170. Other default access rules are also possible.

In some embodiments, when the NVM device 170 does not have a predefined association with the instruction file 130 (suggesting that there is no current owning entity), the computing device 105 or the VM 195-1 associated with the first port 165 may generate the instruction file 130 and thereby establish the first owning entity as the current owning entity of the NVM device 170. As shown, the instruction file 130 is stored in the memory 125 of the computing device 105. However, alternate locations are also possible for storing the instruction file 130, such as within the NVM device 170, at a separate storage location connected with the network 115, and communicated to a separate storage location connected with an external network (e.g., the Internet).

Thus, controlling access using the instruction file 130 may protect any encrypted data on the NVM device 170 from being deleted by the VM 195-1 associated with the first port 165, and may protect any unencrypted data on the NVM device 170 from being read and from being deleted.

As mentioned above, the request restriction 150 may require the computing device 105 to communicate a request to the current owning entity prior to providing access to the data stored in the NVM device 170. In one example in which a first VM 195-1 seeks to delete the data on the NVM device 170, the computing device 105 may first determine whether the first VM 195-1 intended to delete the data. The computing device 105 may then communicate with a second VM 195-2 associated with the current owning entity, requesting that ownership be transferred to the first VM 195-1. The administrator of the second VM 195-2 may grant the request to transfer ownership. Alternatively, if the request appears to be made in error, the administrator of the second VM 195-2 may contact their hardware administrator to investigate the cause of the error. Until the error is resolved, read and/or delete access is not provided to the first VM 195-1 to ensure the data on the NVM device 170 remains protected.

In some cases, the computing device 105 may be unable to determine whether the second VM 195-2 (that is, associated with the current owning entity) has a same configuration as when the NVM device 170 was connected with the associated port 165. For example, the second VM 195-2 may be executing different software following a reinstallation of the operating system (OS).

In some embodiments, the computing device 105 is configured to determine the configuration of the second VM 195-2 using a public key 132 of the instruction file 130. The computing device 105 may communicate a request to the second VM 195-2 to perform a predefined operation using a private key 196-2 associated with the second VM 195-2, and may verify a result of the operation using the public key 132. For example, the predefined operation may comprise encrypting a block of text with the private key 196-2. The first VM 195-1 also comprises a private key 196-1.

When the result of the operation is different than an expected result of the operation, this may indicate that the second VM 195-2 has been reconfigured and is therefore no longer the current owning entity associated with the NVM device 170. In such a case, the computing device 105 may disregard the one or more restrictions 135 when providing, to the first VM 195-1, access to the data stored in the NVM device 170.

As mentioned above, the instruction file 130 may be alternately stored at a separate storage location connected with an external network (e.g., the Internet). The storage location may serve as a global clearinghouse or central repository for accessing the NVM device 170. For example, the NVM device 170 may have been connected with a port 165 of a computing device 110, and assigned to a particular VM 195. Assume that the NVM device 170 is removed from the plurality of computing devices 110 and subsequently connected with a personal computing device. The personal computing device is likely unable to communicate directly with the computing device 105 and VM 195, as the system 100 may be isolated from external networks using a firewall. In some embodiments, the VM 195 owning the NVM device 170 may release permissions to access the NVM device 170 to the global clearinghouse that is publicly accessible (on the Internet).

Thus, in some embodiments, the plurality of networked computing devices 110-1, 110-2, . . . , 110-N are networked in a private network 115, and the computing device 105 is configured to determine that the second owning entity has released ownership of the NVM device 170. The computing device 105 is further configured to communicate, with a network location on a public network, information indicating the released ownership of the NVM device 170.

Figure 2:
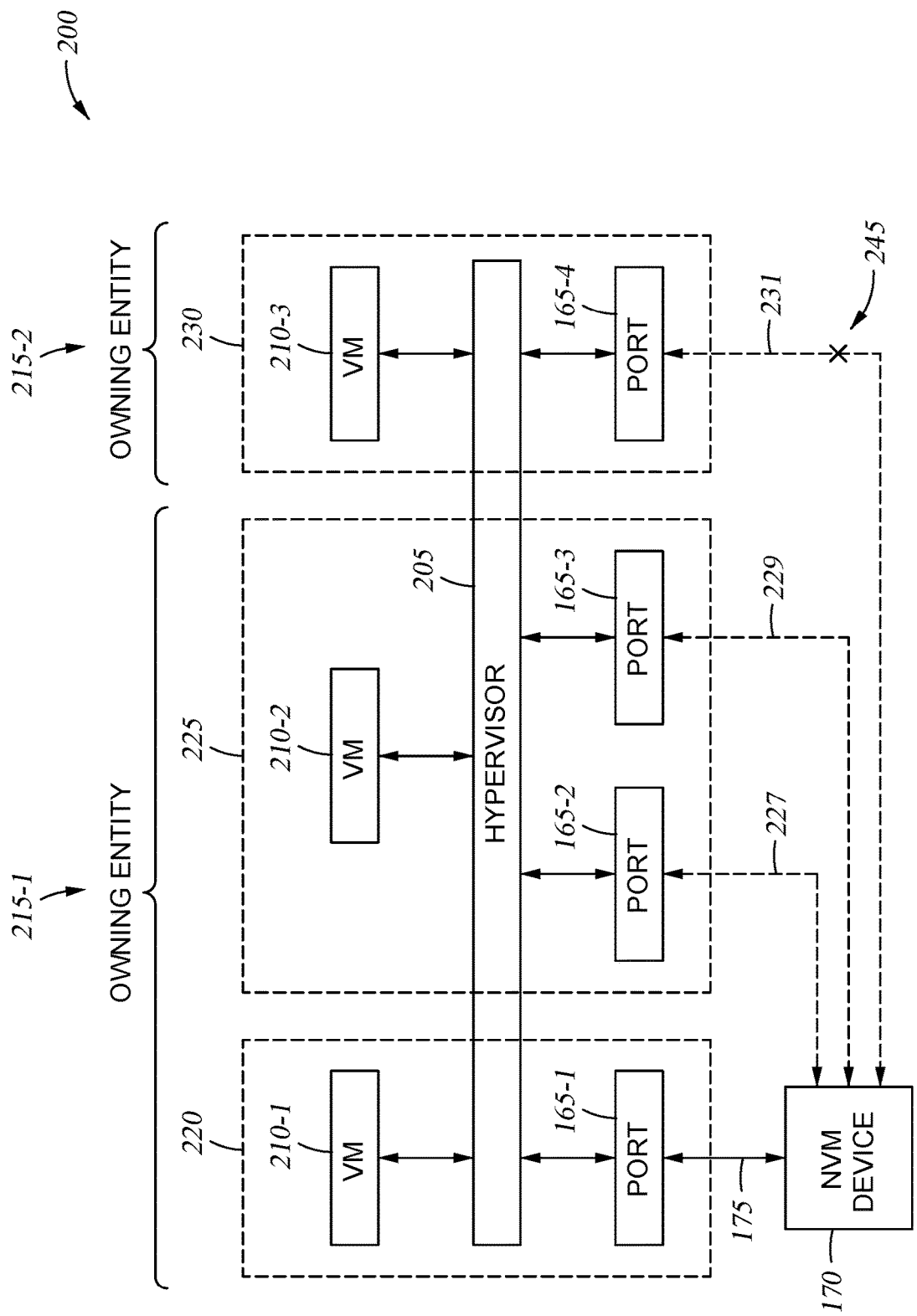
FIG. 2 is a diagram illustrating exemplary removable connections of a NVM device with a plurality of physical ports, according to one or more embodiments.

FIG. 2 is a diagram 200 illustrating exemplary removable connections of a NVM device with a plurality of physical ports, according to one or more embodiments. The features of diagram 200 may be used in conjunction with other embodiments, such as the system 100 of FIG. 1.

In the diagram 200, a hypervisor 205 is configured to dynamically configure one or more VMs 210-1, 210-2, 210-3 using computing resources provided by one or more networked computing devices. In some embodiments, the hypervisor 205 may be implemented using the computing device 105 of FIG. 1.

The VMs 210-1, 210-2 are associated with a first owning entity 215-1, such as a first user or customer. The VM 210-3 is associated with a second owning entity 215-2, such as a second user or customer. The VM 210-1 owns the port 165-1 (as shown by group 220), the VM 210-2 owns the ports 165-2, 165-3 (as shown by group 225), and the VM 210-3 owns the port 165-4 (as shown by group 230).

The NVM device 170 is connected with the port 165-1 via the connection 175, and is therefore associated with VM 210-1. If the NVM device 170 were subsequently connected with the port 165-2 via the connection 227, or with the port 165-3 via the connection 229, the VM 210-2 would be permitted to access the NVM device 170 as the VMs 210-1, 210-2 are associated with the same owning entity 215-1. However, if the NVM device 170 were subsequently connected with the port 165-4 via the connection 231, the VM 210-3 would not be permitted to access the NVM device 170 (indicated by an x mark 245 on the connection 231) as the VM 210-3 is associated with a different owning entity 215-2.

Figure 3B:
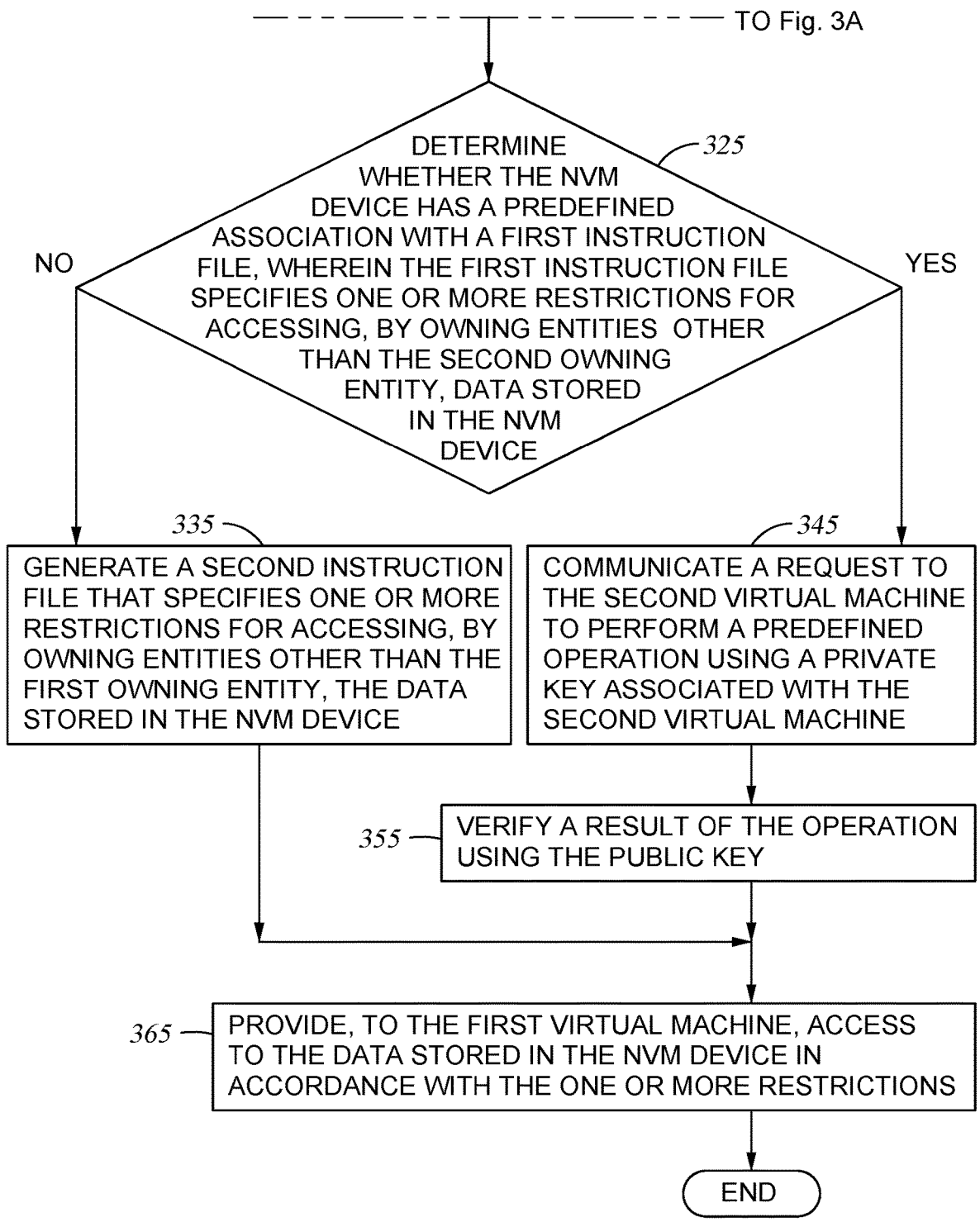

FIGS. 3A and 3B illustrate an exemplary method 300 for use with a plurality of networked computing devices comprising a plurality of physical ports, according to one or more embodiments. The method 300 may be used in conjunction with other embodiments, such as being performed by the computing device 105 of FIG. 1.

Method 300 begins at block 305, where the computing device determines that a non-volatile memory (NVM) device is removably connected with a first port of the plurality of physical ports. The first port is owned by a first virtual machine associated with a first owning entity. At block 315, the computing device determines whether the NVM device was previously connected with a second port of the plurality of physical ports. The second port is owned by a second virtual machine associated with a second owning entity.

At block 325, the computing device determines whether the NVM device has a predefined association with a first instruction file. The first instruction file specifies one or more restrictions for accessing, by owning entities other than the second owning entity, data stored in the NVM device.

If the NVM device has the predefined association ("YES"), method 300 proceeds to block 345, where the computing device communicates a request to the second virtual machine to perform a predefined operation using a private key associated with the second virtual machine. At block 355, the computing device verifies a result of the operation using the public key. At block 365, the computing device provides, to the first virtual machine, access to the data stored in the NVM device in accordance with the one or more restrictions.

However, if at block 325 the NVM device is determined to not have the predefined association ("NO"), the method 300 proceeds to block 335, and the computing device generates a second instruction file that specifies one or more restrictions for accessing, by owning entities other than the first owning entity, the data stored in the NVM device. The method 300 proceeds to block 365, and ends following completion of block 365.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet.

While the foregoing is directed to embodiments of the present disclosure, other and further embodiments of the disclosure may be devised without departing from the basic scope thereof, and the scope thereof is determined by the claims that follow.

What is claimed is:

1. A system comprising:
  a non-volatile memory (NVM) device; and
  a plurality of networked computing devices comprising a plurality of physical ports, wherein a first computing device of the plurality of networked computing devices is configured to:
    determine that the NVM device is removably connected with a first port of the plurality of physical ports, wherein the first port is owned by a first virtual machine associated with a first owning entity;
    determine whether the NVM device was previously connected with a second port of the plurality of physical ports, wherein the second port is owned by a second virtual machine associated with a second owning entity;
    determine whether the NVM device has a predefined association with a first instruction file, wherein the first instruction file specifies one or more restrictions for accessing, by owning entities other than the second owning entity, data stored in the NVM device;
    communicate a request to the second virtual machine to perform a predefined operation using a private key associated with the second virtual machine;
    verify a result of the operation using a public key of the instruction file; and
    provide, to the first virtual machine, access to the data stored in the NVM device in accordance with the one or more restrictions.

2. The system of claim 1, wherein the NVM device is determined to not have the predefined association with the first instruction file, wherein the first computing device is further configured to:
  generate a second instruction file that specifies one or more restrictions for accessing, by owning entities other than the first owning entity, the data stored in the NVM device.

3. The system of claim 1, wherein the one or more restrictions for accessing data stored in the NVM device comprise one or more of:
  restricting the owning entities from deleting the data stored in the NVM device;
  restricting the owning entities from reading the data stored in the NVM device; and
  communicating a request to the second owning entity prior to providing, to the first owning entity, delete access or read access to the data stored in the NVM device.

4. The system of claim 1, wherein the result of the operation is different than an expected result of the operation, wherein the first computing device is further configured to:

disregard the one or more restrictions when providing, to the first virtual machine, access to the data stored in the NVM device.

5. The system of claim 1, wherein the plurality of networked computing devices are networked in a private network, wherein the first computing device is further configured to:

determine that the second owning entity has released ownership of the NVM device; and communicate, with a network location on a public network, information indicating the released ownership of the NVM device.

6. The system of claim 1, wherein the NVM device is included in one of:

a solid-state drive (SSD) configured to communicate using Non-Volatile Memory Express (NVMe);

a Peripheral Component Interconnect Express (PCIe) card; and a Universal Serial Bus (USB) device.

7. A computer program product for use with a plurality of networked computing devices comprising a plurality of physical ports, the computer program product comprising:

a computer-readable storage medium having computer-readable program code embodied therewith, the computer-readable program code executable by one or more computer processors to:

determine that a non-volatile memory (NVM) device is removably connected with a first port of the plurality of physical ports, wherein the first port is owned by a first virtual machine associated with a first owning entity;

determine whether the NVM device was previously connected with a second port of the plurality of physical ports, wherein the second port is owned by a second virtual machine associated with a second owning entity;

determine whether the NVM device has a predefined association with a first instruction file, wherein the first instruction file specifies one or more restrictions for accessing, by owning entities other than the second owning entity, data stored in the NVM device;

communicate a request to the second virtual machine to perform a predefined operation using a private key associated with the second virtual machine;

verify a result of the operation using a public key of the instruction file; and provide, to the first virtual machine, access to the data stored in the NVM device in accordance with the one or more restrictions.

8. The computer program product of claim 7, wherein the NVM device is determined to not have the predefined association with the first instruction file, wherein the computer-readable program code is further executable to:

generate a second instruction file that specifies one or more restrictions for accessing, by owning entities other than the first owning entity, the data stored in the NVM device.

9. The computer program product of claim 7, wherein the one or more restrictions for accessing data stored in the NVM device comprise one or more of:

restricting the owning entities from deleting the data stored in the NVM device;

restricting the owning entities from reading the data stored in the NVM device; and communicating a request to the second owning entity prior to providing, to the first owning entity, delete access or read access to the data stored in the NVM device.

10. The computer program product of claim 7, wherein the result of the operation is different than an expected result of the operation, wherein the computer-readable program code is further executable to:

disregard the one or more restrictions when providing, to the first virtual machine, access to the data stored in the NVM device.

11. The computer program product of claim 7, wherein the plurality of networked computing devices are networked in a private network, wherein the computer-readable program code is further executable to:

determine that the second owning entity has released ownership of the NVM device; and communicate, with a network location on a public network, information indicating the released ownership of the NVM device.

12. The computer program product of claim 7, wherein the NVM device is included in one of:

a solid-state drive (SSD) configured to communicate using Non-Volatile Memory Express (NVMe);

a Peripheral Component Interconnect Express (PCIe) card; and a Universal Serial Bus (USB) device.

13. A computing device comprising:

one or more computer processors; and a memory comprising computer-readable program code executable by the one or more computer processors to:

provide supervisory functionality for virtualization of a plurality of computing devices comprising a plurality of physical ports;

determine, while a non-volatile memory (NVM) device is removably connected to a first port of the plurality of physical ports, that a current owning entity of the NVM device is different from an owning entity of the first port;

communicate, to a first virtual machine owned by the current owning entity, a request to perform a predefined operation;

based on a result of the operation, determine a configuration of the first virtual machine; and provide, based on the configuration of the first virtual machine, access to data stored in the NVM device to a second virtual machine owned by the owning entity of the first port.

14. The computing device of claim 13, wherein the memory further comprises:

an instruction file specifying one or more restrictions for accessing, by owning entities other than the current owning entity, the data stored in the NVM device, wherein providing access to the data is responsive to validating the result of the operation and is in accordance with the one or more restrictions.

15. The computing device of claim 14, wherein the instruction file further comprises a public key, wherein the predefined operation is performed using a private key associated with the first virtual machine, and wherein validating the result of the operation is performed using the public key.

16. The computing device of claim 15, wherein the predefined operation comprises encrypting a block of text using the private key.

17. The computing device of claim 13, wherein the memory further comprises:
- an instruction file specifying one or more restrictions for accessing, by owning entities other than the current owning entity, the data stored in the NVM device,
- wherein, when the result of the operation indicates that the first virtual machine has been reconfigured, the one or more restrictions are disregarded when providing access to the data.

* * * * *